Sept. 15, 1942.                    D. G. C. LUCK                    2,296,041
                              NAVIGATION INSTRUMENT
                              Filed Jan. 31, 1939                 2 Sheets-Sheet 1
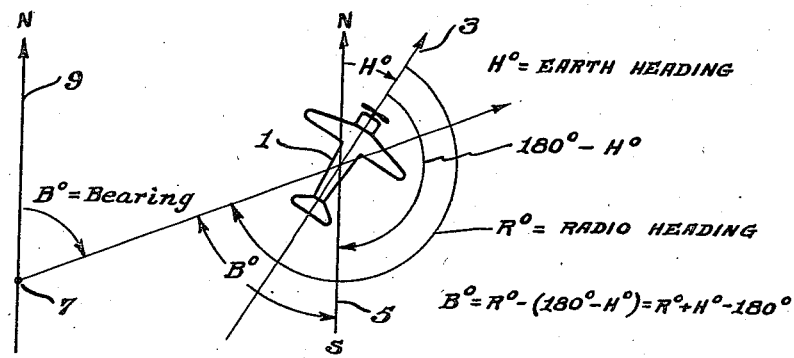
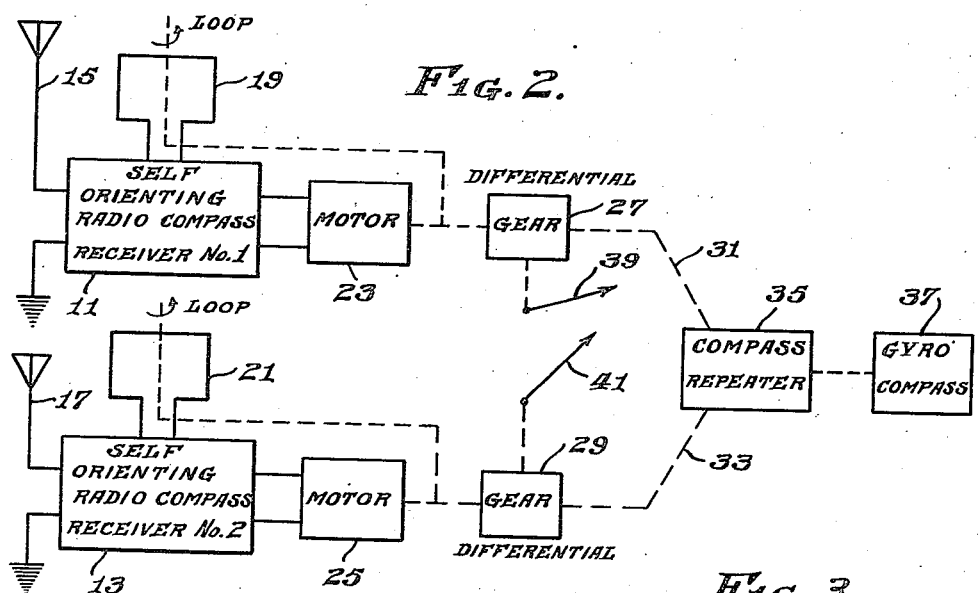
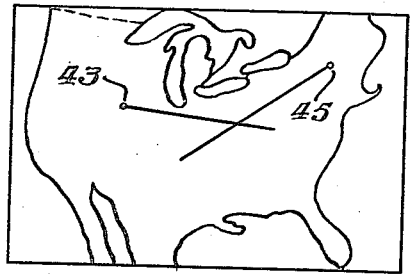
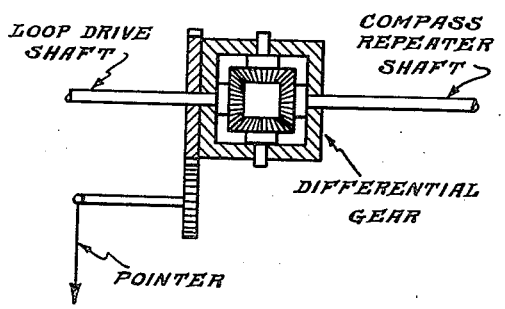
Inventor
David G. C. Luck
By
    Attorney Sept. 15, 1942.　　　D. G. C. LUCK　　　2,296,041
NAVIGATION INSTRUMENT
Filed Jan. 31, 1939　　　2 Sheets-Sheet 2
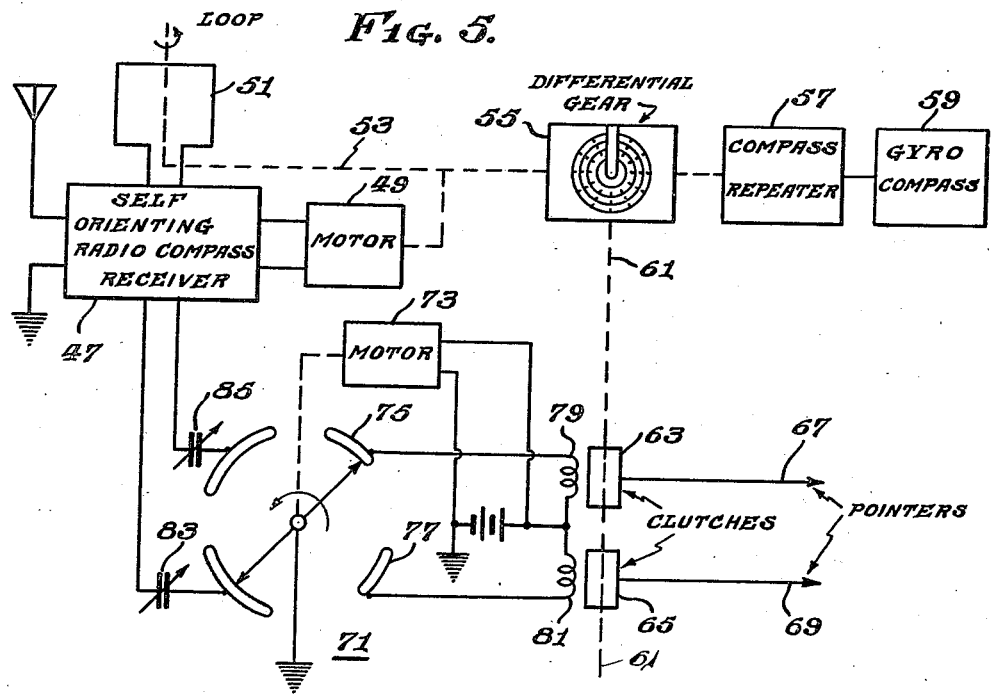
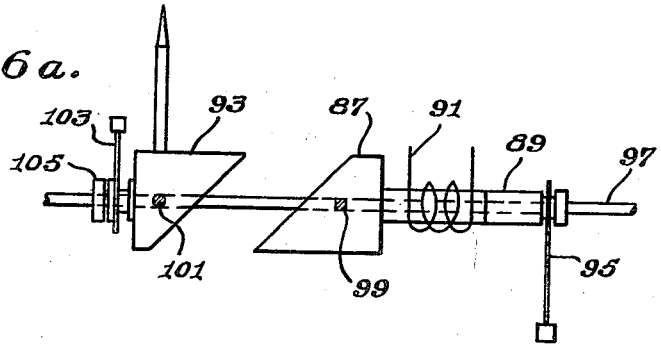
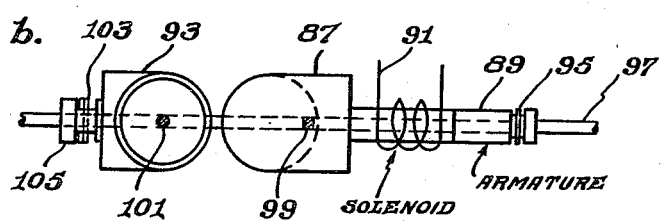
Inventor
David G.C. Luck
Attorney Patented Sept. 15, 1942

2,296,041

UNITED STATES PATENT OFFICE 2,296,041

NAVIGATION INSTRUMENT

David G. C. Luck, Oaklyn, N. J., assignor to Radio Corporation of America, a corporation of Delaware Application January 31, 1939, Serial No. 253,892

5 Claims. (Cl. 250—11)

This invention relates to navigation instruments and more especially to an instrument in which radio headings and earth compass headings are combined to indicate a radio bearing with respect to a meridian. The invention further contemplates the use of crossed pointers on a map to indicate position as a function of two radio bearings.

If an earth compass of the magnetic, earth inductor or gyroscopic type is used on a mobile vehicle, the compass will indicate the heading of the vehicle with respect to the meridian. If a radio compass is used, it will indicate a line, with respect to an axis of the vehicle, on which a radio transmitter is located. If the radio compass has "sense," it will indicate not only the line along which the radio station is located, but the sense of direction of the transmitter. If the radio bearing of the vehicle with reference to a meridian line be required, it is necessary to add algebraically the radio compass indication and the earth compass indication.

If position is to be determined, it is customary to use two or more bearings. The intersection of two bearings will indicate position. It has been proposed to employ a pair of crossed indicators on a map. The axes about which the indicators rotate are made to correspond respectively to the locations of a pair of radio transmitters. The bearings obtained by radio are indicated by the pointers and their intersection indicates position. When such a device is stationary, the means for operating the pointers may be relatively simple. If the map installation is used on a vehicle which may be continuously changing its heading, it becomes necessary to make corresponding changes in the orientation of the map or both pointers. The means previously employed to either orient the map or the pointers have been complex.

It is an object of the present invention to provide relatively simple means for effecting true bearing or position indications on a mobile vehicle.

Another object is to provide means for obtaining radio bearings related to a meridian.

Another object is to provide means for combining the indications of a radio compass and an earth compass to obtain radio bearings related to a meridian.

A further object is to provide means for obtaining a pair of bearings by combining radio and earth compass indications.

A still further object is to provide means for indicating position on a map by applying automatically indications of bearings obtained by radio.

The invention will be described by referring to the accompanying drawings in which—

Figure 1 is a diagrammatic presentation of the navigational problem to be solved, Figure 2 is a schematic representation of one embodiment of the invention, Figure 3 is a view partly in section of an element of the invention, Figure 4 is a plan view representing a position indicator, Figure 5 represents another embodiment of the invention, and Figures 6a and 6b represent a clutch used in the embodiment represented by Fig. 5.

Referring to Fig. 1, the operator of an airplane 1 flying a course 3 obtains its earth heading H°, in terms of angular departure from the north-south meridian line 5, by means of an earth compass. By means of radio compass, a radio heading R° is obtained from a radio transmitter located at the point 7 on a meridian line 9. The actual bearing of the aircraft from the radio transmitter, with respect to the meridian line, is B° which may be determined from the equation $$B° = R° - (180° - H°) = R° + H° - 180°$$

The foregoing problem in navigation may be solved by combining automatic bearing indication from the radio and earth compasses, as will be explained by reference to Fig. 2. A pair of radio compass receivers 11, 13 are connected to omnidirectional antennas 15, 17 and to self-orienting loop antennas 19, 21. The outputs of the radio receivers are applied respectively to motors 23, 25. The rotating element of each motor is connected to one of the loops whereby the loop becomes self-orienting. This connection may be a flexible shaft or any means responsive to the movement of the motor elements. The motors are also connected respectively to differential gears 27, 29. The differential gears are coupled by flexible shafts 31, 33 or the like to a compass repeater 35, which is controlled by an earth compass, such as a gyro 37. The output shafts of the differential gears are coupled respectively to a pair of pointers 39, 41. This coupling may also be a flexible shaft.

Any suitable type of differential gear may be employed. One suitable arrangement is shown in Fig. 3. It should be understood that the differential gearing adds, in the algebraic sense, the bearing indications from each of the self-orienting radio compasses and the earth compass. The combined indications are represented by the position of either of the pointers which indicate the bearing B° as described in connection with Fig. 1. It should be understood that, if the heading of the vehicle carrying the instrument is altered, the radio compass and the earth compass indications will both change by the same amount but in opposite directions, and the pointers will continue to indicate true bearings with respect to the meridian.

If it is only desired to obtain a single bearing indication, it should be understood that one of the self-orienting radio compasses may be omitted. The remaining self-orienting compass is successively adjusted to obtain bearings with respect to two or more radio transmitters and the position of the vehicle determined by plotting the bearings on a map. Using two simultaneously indicated bearings makes it possible to position the axes 43, 45 of the pointers 39, 41 at locations on a map corresponding to the locations of two radio transmitters, as indicated in Fig. 4. The intersections of the pointers will indicate the position of the vehicle, carrying the instrument, with respect to the map.

The use of two self-orienting radio compasses requires a substantial amount of apparatus and an additional weight which may be objectionable for aircraft installations. A single self-orienting radio compass navigational instrument may be arranged to obtain alternate bearings as shown in Fig. 5. A self-orienting radio compass receiver 47 has its output circuit connected to a motor 49. The shaft of the motor is coupled to the loop antenna 51 by means of a shaft 53. The motor shaft is also connected to a differential gear 55. The differential gear is in turn connected to a compass repeater 57, which may be controlled by a gyro or other earth compass 59.

The shaft 61 from from the differential gearing is connected to a pair of clutches 63, 65 which operate to alternately position the indicating pointers 67, 69. The alternate operation of the clutches is controlled by a switch 71, which is preferably driven by a motor 73. The switch includes a pair of contacts 75, 77, which are connected respectively to clutch windings 79, 81. The switch is also arranged so that it alternately and synchronously connects a pair of tuning elements 83, 85 to the radio receiver, whereby it may be alternately tuned to two transmitters operating on different frequencies.

In the operation of this circuit, the self-orienting compass is alternately tuned to a pair of transmitters. The alternations of the tuning are at a rate which permits the loop 51 to become oriented to indicate the radio bearing of each of the transmitters. At the interval when the loop is oriented to one transmitter, one of the clutches 63 is engaged to orient its pointer 67, while the other clutch is deenergized, leaving its pointer 69 in a locked position. When the receiver is tuned to the other station by means of element 85, the first-mentioned clutch 63 is deenergized, leaving its pointer 67 locked in the previous bearing indication, and the second clutch 65, being energized, orients its pointer 69 to indicate the second bearing. The earth compass indications are combined with the radio compass indications in the differential gear, as previously explained. The differential gear may be arranged to include one or more scales, which are responsive to the loop orientation, gyro compass heading and resultant bearings. These serve to give unified indication of complete navigational data to the aircraft operator.

While any type of positively positioning clutching may be used, it is desirable to employ a clutch which will automatically lock the pointers when the clutch is disengaged. One suitable form of clutch is shown in Figs. 6a and 6b. The longitudinally movable part of the clutch 87 includes an armature 89 which is attracted when the solenoid winding 91 is energized to bring about the engagement of the movable part of the clutch with the pointer section of the clutch 93 which may be moved longitudinally within limits and which may be rotated freely as hereinafter described. The movable section of the clutch includes a biasing spring 95 which draws the clutch out of engagement when the solenoid 91 is deenergized. The shaft 97 is preferably a square cross-section 99, to thereby cause the movable portion of the clutch 87 to rotate with the shaft 97, which is coupled to the shaft 61 from the differential gear. The portion of the shaft coupled to the pointer portion of the clutch is of circular cross-section 101 to permit the shaft to rotate freely without disturbing the pointer when the clutch is disengaged. The movable pointer portion includes a biasing spring 103 which cooperates with a shoulder 105 to brake or lock the pointer arm in the bearing indicating position. Between the braking position and the freely rotatable position the pointer portion 93 including the shoulder 105 may be moved longitudinally. Since the shaft 97 is usually operated in a vertical position, the weight of the pointer portion 93 will be sufficient to brake the pointer portion against the spring member 103.

Thus, the invention has been described as a navigation instrument in which radio headings are obtained from a self-orienting radio compass. An earth compass with a repeater provides earth heading indications which are combined with the radio compass indication by means of a differential gear to indicate a true radio bearing in terms of a fixed or meridian line. If position indication is desired, a pair of true bearings are automatically indicated on the map so that the intersection of the bearings indicates position. While the invention is not limited to any particular receiver, a description of one suitable form of self-orienting radio compass receiver will be found in the copending application of Bond and Carlson, Serial No. 196,817, filed March 19, 1938 for "Self-orienting radio direction finders." In place of flexible shafts, "Selsyn" or "Autosyn" motors may be used for remote control and remote indication. In like manner a differential "Selsyn" motor may be substituted for the mechanical differential gears.

I claim as my invention:

1. A navigation instrument including in combination a self-orienting radio compass, means for alternately tuning said radio compass to the waves from a pair of radio stations, means for indicating the alternate orientations of said radio compass, an earth compass, means for combining the alternate indications of said radio compass orientation with said earth compass indication, and means responsive in synchronism with said alternate tuning means to indicate a pair of bearings with respect to a meridian line.

2. An instrument of the character of claim 1 in which said means responsive in synchronism with said alternate tuning means to indicate a pair of bearings with respect to a meridian line, includes a map and pointers for applying automatically said bearings to said map to indicate a position thereon corresponding to the geographic position of said instrument.

3. Radio position indicating apparatus for conveyances comprising, a directional antenna, reversible servo motor means controlled at least in part from said directional antenna for successively moving said antenna into null positions with respect to the directions of arrival of radio impulses from a number of transmitting stations and for holding said antenna in such null positions for predetermined short intervals, a chart, and repeating mechanism operated at least in part from said servo motor means for indicating the position of the conveyance upon said chart.

4. Radio position indicating apparatus for conveyances comprising, a directional antenna, reversible servo motor means controlled at least in part from said directional antenna for successively moving said antenna into null positions with respect to the directions of arrival of radio impulses from a number of transmitting stations, means for maintaining an azimuthal base line, a chart, and repeating mechanism operated differentially from said servo motor means and said base line means for continuously indicating the position of the conveyance upon said chart.

5. A navigation instrument including in combination a self-orienting tunable radio compass, means for alternately tuning said radio compass to the signals from a pair of radio transmitters for producing alternate orientations of said radio compass, an earth compass, means for combining the alternate orientations of said radio-compass with the settings of said earth compass, and means controlled by said combining means and responsive in synchronism with said alternate tuning means to indicate a pair of bearings with respect to a meridian line.

DAVID G. C. LUCK.